US005694239A

United States Patent [19]
Shigematsu et al.

[11] Patent Number: 5,694,239
[45] Date of Patent: Dec. 2, 1997

[54] OPTICAL PHASE CONJUGATOR, OPTICAL TRANSMISSION SYSTEM USING THE SAME, AND OPTICAL PHASE CONJUGATION METHOD

[75] Inventors: Masayuki Shigematsu; Masayuki Nishimura, both of Yokohama, Japan

[73] Assignee: Sumitomo Electric Industries, Ltd., Osaka, Japan

[21] Appl. No.: 498,985

[22] Filed: Jul. 6, 1995

[30] Foreign Application Priority Data

Jul. 8, 1994 [JP] Japan ..................... 6-157661

[51] Int. Cl.$^6$ ..................................... G02F 1/39
[52] U.S. Cl. ................. 359/332; 359/326; 359/330; 385/122
[58] Field of Search ................. 359/326–332; 372/9, 21, 22; 385/122

[56] References Cited

U.S. PATENT DOCUMENTS

| | | | |
|---|---|---|---|
| 4,321,550 | 3/1982 | Evtuhov | 372/9 X |
| 4,344,042 | 8/1982 | Hon | 372/21 X |
| 5,386,314 | 1/1995 | Jopson | 359/326 |
| 5,532,868 | 7/1996 | Gnauck et al. | 359/332 |
| 5,550,671 | 8/1996 | Simpson et al. | 385/122 X |

OTHER PUBLICATIONS

Watanabe et al: "Compensation of Chromatic Dispersion in a Single–Mode Fiber by Optical Phase Conjugation", IEEE Photonics Technology, vol. 5, No. 1, Jan. 1993, pp. 92–95.

Kiuchi, et al: "Compensation for Pulse Waveform Distortion in Ultra–Long Distance Optical Communication Systems by using Midway Optical Phase Conjugator", IEEE Photonics Letters, vol. 6, No. 1, Jan. 1994, pp. 104–105.

*Primary Examiner*—John D. Lee
*Attorney, Agent, or Firm*—Cushman Darby & Cushman IP Group of Pillsbury Madison & Sutro LLP

[57] ABSTRACT

An optical phase conjugator includes an optical nonlinear medium for receiving original signal light and pumping light, and generating and outputting phase-conjugate light by a nonlinear optical effect. The optical nonlinear medium contains an element which can be activated upon irradiation of activation light and has an amplification function with respect to at least the pumping light. The optical phase conjugator comprises a first optical coupler for coupling the original signal light and the pumping light and then inputting the coupled light into the medium, and a second optical coupler for inputting the activation light into the medium. An improvement in phase-conjugate light generating efficiency is attained, and phase-conjugate light having a sufficiently high intensity can be obtained by the optical phase conjugator with a simple, compact arrangement.

36 Claims, 9 Drawing Sheets

————— : CONVENTIONAL OPTICAL PHASE CONJUGATOR

——————— : OPTICAL PHASE CONJUGATOR USING THE OPTICAL FIBER SHOWN IN FIG.4(PRESENT INVENTION)

— — — — : OPTICAL PHASE CONJUGATOR USING THE OPTICAL FIBER SHOWN IN FIG.6(PRESENT INVENTION)

OPTICAL PHASE CONJUGATOR, OPTICAL TRANSMISSION SYSTEM USING THE SAME, AND OPTICAL PHASE CONJUGATION METHOD

BACKGROUND OF THE INVENTION

1. Field of the Invention

The present invention relates to an optical phase conjugator for mixing two types of light to generate third light having a new wavelength, an optical transmission system using the same, and an optical phase conjugation method.

2. Related Background Art

It is known to compensate for wavelength dispersion in digital optical transmission using an optical phase conjugation method. Phase-conjugate light is generated based on an original signal light by using a nonlinear optical effect at a predetermined position in a transmission path, and treating the phase-conjugate light as signal light after the predetermined position has attracted a great deal of attention (S. Watanabe et al.: IEEE PHOTONICS TECHNOLOGY LETTERS, VOL. 5, NO. 1, JANUARY 1993, pp. 92–95).

FIG. 1 is a general view for explaining this wavelength dispersion compensation method. As shown in FIG. 1, in a transmission system using this method, original light $f_1(t)$ (wavelength $\lambda_S$; light angular frequency $\omega_S$) is input to an optical phase conjugator 200 via a first single-mode fiber (to be also referred to as SMF hereinafter) 100 (frequency dependent propagation constant $\beta_S(\omega)$). The optical phase conjugator 200 generates phase-conjugate light (wavelength $\lambda_C$; light angular frequency $\omega_C$) and sends it to a second SMF 300 (frequency dependent propagation constant $\beta_S(\omega)$). After the phase-conjugate light passes through the SMF 300, the resultant light is extracted as new signal light $f_2(t)$.

It is known that in such a transmission system, if the following equation (1) is established, a signal waveform can be obtained as an output waveform $f_2(t)$ obtained by correcting the distortion of an input waveform $f_1(t)$ which is caused during propagation in the optical fiber (A. Yariv et al.: Opt. Lett., vol. 4, 1979, pp. 52–54).

$$\frac{\partial^2 \beta_1(\omega_s)}{\partial \omega^2} \cdot L_1 = \frac{\partial^2 \beta_2(\omega_c)}{\partial \omega^2} \cdot L_2$$

It is also known that when a dispersion-shifted optical fiber is used as an element for generating phase-conjugate light, zero-dispersion light is preferable as pumping light to be input to the fiber in terms of phase-conjugate light generating efficiency (K. Kikuchi et al., "Compensation for Pulse Waveform Distortion in Ultra-Long Distance Optical Communication System by using Midway Optical Phase Conjugation", IEEE PHOTONICS LETTERS, VOL. 6, NO. 1, JANUARY 1994, pp. 104–105).

In the conventional optical phase conjugator, however, an improvement in phase-conjugate light generating efficiency is limited.

SUMMARY OF THE INVENTION

In view of this problem, the present invention provides an optical phase conjugator which can improve phase-conjugate light generating efficiency and obtain phase-conjugate light having a sufficient intensity with a simple, compact arrangement.

According to the present invention, there is provided an optical phase conjugator comprising:

an optical nonlinear medium for receiving first light (original signal light) having a first light frequency and second light (pumping light) having a second light frequency, and outputting light containing third light (phase-conjugate light) having a third light frequency generated by a nonlinear optical effect based on the first light and the second light, the optical nonlinear medium containing an element to be activated upon irradiation of fourth light (activation light) having a fourth light frequency and having an amplification function with respect to at least the second light in an active state;

a first optical coupler having a first terminal to which the first light is input, a second terminal to which the second light is input, and a third terminal from which coupled light of the first light and the second light is output, the third terminal being optically connected to an input end of the optical nonlinear medium; and a second optical coupler, optically connected to at least one end selected from the group consisting of the input end and an output end of the optical nonlinear medium, for inputting the fourth light into the medium.

Preferably, the following relationship is established between the first, second, and third light frequencies:

$$v_3 = 2v_2 - v_1$$

where $v_1$ is the first light frequency, $v_2$ is the second light frequency, and $v_3$ is the third light frequency. In addition, the fourth light frequency is preferably higher than the first light frequency, the second light frequency, and the third light frequency.

The element may be an element which amplifies incident light by induced emission when the element is in an active state. The element is preferably a rare earth element, and more preferably erbium. The optical nonlinear medium preferably contains 0.1 ppm to 10 ppm by weight of erbium.

The optical nonlinear medium is preferably a dispersion-shifted optical fiber. The specific refractive index difference of the fiber is preferably 0.1% or more, and more preferably 1.2% or more. In addition, it is preferable that the second light frequency be almost the same as that of zero-dispersion light used for the optical nonlinear medium.

The optical phase conjugator of the present invention may further comprises a first light source, optically connected to the second terminal of the first optical coupler, for generating the second light, and a second light source, optically connected to the first terminal of the second optical coupler, for generating the fourth light.

Furthermore, the optical phase conjugator of the present invention may further comprise an optical filter (wavelength filter), optically connected to the output end of the optical nonlinear medium, for selectively transmitting the third light of light output from the optical nonlinear medium.

According to one aspect of the optical phase conjugator of the present invention, the second optical coupler has a first terminal to which the fourth light is input, a second terminal to which light output from the optical nonlinear medium is input and from which the fourth light is output, and a third terminal from which light input from the second terminal is output, the second terminal being optically connected to the output end of the optical nonlinear medium.

According to the another aspect of the optical phase conjugator of the present invention, the second optical coupler has a first terminal to which the fourth light is input, a second terminal to which light output from the first optical coupler is input, and a third terminal from which coupled light of light input from the second terminal and the fourth light is output, the second terminal being optically connected to the third terminal of the first optical coupler, and the third terminal being optically connected to the input end of the optical nonlinear medium.

According to still another aspect of the optical phase conjugator of the present invention, the conjugator further comprises a third optical coupler having a first terminal to which the fourth light is input, a second terminal to which light output from the optical nonlinear medium is input and from which the fourth light is output, and a third terminal from which light input from the second terminal is output, the second terminal being optically connected to the output end of the optical nonlinear medium, and the second optical coupler has a first terminal to which the fourth light is input, a second terminal to which light output from the first optical coupler is input, and a third terminal from which coupled light of light input from the second terminal and the fourth light is output, the second terminal being optically connected to the third terminal of the first optical coupler, and the third terminal being optically connected to the input end of the optical nonlinear medium.

In addition, according to the present invention, there is provided an optical transmission system comprising:

a) the optical phase conjugator of the present invention; and b) an optical fiber, having an output end optically connected to the first terminal of the first optical coupler of the optical phase conjugator, for transmitting the first light to the optical phase conjugator.

The optical transmission system of the present invention may further comprise:

c) an optical emitter (transmitter), optically connected to the input end of the optical fiber, for generating the first light;

d) an optical receiver, optically connected to the output end of the optical nonlinear medium of the optical phase conjugator, for detecting light output from the optical phase conjugator;

e) an optical amplifier, optically connected to the output end of the optical fiber, for amplifying and outputting the first light transmitted along the optical fiber; and f) an optical filter, arranged between an output end of the optical amplifier and the first terminal of the first optical coupler, for selectively transmitting only the first light of light amplified by the optical amplifier.

Furthermore, according to the present invention, there is provided an optical transmission system comprising:

a) the optical phase conjugator of the present invention; and b) an optical fiber, having an input end optically connected to the output end of the optical nonlinear medium of the optical phase conjugator, for transmitting light output from the optical phase conjugator.

The optical transmission system of the present invention may further comprise:

c) an optical emitter, optically connected to the first terminal of the first optical coupler of the optical phase conjugator, for generating the first light;

d) an optical receiver, optically connected to the output end of the optical fiber, for detecting light transmitted along the optical fiber;

e) an optical amplifier, having input and output ends optically connected to the output end of the optical nonlinear medium of the optical phase conjugator, and the input end of the optical fiber, respectively, for amplifying light output from the optical phase conjugator;

f) a local light source for generating fifth light having substantially the same light frequency as the third light frequency; and g) a fourth optical coupler having a first terminal optically connected to the local light source, a second terminal optically connected to the output end of the optical fiber, and a third terminal from which coupled light of light transmitted along the optical fiber and the fifth light is output.

Moreover, according to the present invention, there is provided an optical phase conjugation method comprising:

a step of coupling first light having a first light frequency and second light having a second light frequency;

a step of inputting coupled light of the first light and the second light to an optical nonlinear medium, generating third light having a third light frequency by a nonlinear optical effect based on the first light and the second light, and outputting light containing the third light; and a step of inputting fourth light having a fourth light frequency to the optical nonlinear medium, activating an element contained in the optical nonlinear medium upon irradiation of the fourth light, and causing the element in an active state to amplify at least the second light.

In the optical phase conjugator and optical phase conjugation method of the present invention, the first light having the first light frequency ($v_1$) is input as original signal light. This original signal light is input from the first terminal to the first optical coupler. At the same time, the second light having the second light frequency ($v_2$) output from the first light source is input as pumping light from the second terminal. The first optical coupler couples the first light and the second light and outputs the coupled light from the third terminal. The light output from the third terminal of the first optical coupler is input to the optical nonlinear medium and propagates therein. Along with this propagation of the coupled light, the third light (phase-conjugate light) having the third light frequency ($v_3$) is generated in the optical nonlinear medium, and this phase-conjugate light is obtained as new signal light.

An element (e.g., a rare earth element) which can be activated by the fourth light (activation light) having the fourth light frequency ($v_4$) is contained in the optical nonlinear medium according to the present invention, and the activation light is incident on the optical nonlinear medium. With this operation, the first light (original signal light) and the second light (pumping light) which are incident on the optical nonlinear medium are amplified by an amplification effect (e.g., induced emission) of the activated element while they propagate in the optical nonlinear medium. Although the first light (original signal light) and the second light (pumping light) will be attenuated owing to absorption during propagation in the optical nonlinear medium, attenuation does not greatly occur because the first light and the second light can be amplified in the optical nonlinear medium in the above-described manner. Preferably, the first light and the second light, each having an almost constant intensity or a higher intensity, may be propagate in the optical nonlinear medium. In addition, generated phase-conjugate light itself can be amplified while it propagates in the optical nonlinear medium. As a result, in the optical phase conjugator and optical phase conjugation method of the present invention, a very high phase-conjugate light generating efficiency can be attained.

As described above, in the optical phase conjugator of the present invention, which is designed to generate phase-conjugate light, if an optical filter for selectively transmitting light having almost the same wavelength as that of phase-conjugate light is arranged on the optical path of output light from the optical phase conjugator, only phase-conjugate light can be obtained as new signal light.

According to the optical transmission system of the present invention, which has the optical phase conjugator of the present invention, therefore, the phase-conjugate light generating efficiency is much higher than that in the conventional optical phase conjugator, thereby realizing longer optical transmission paths connected to the input and output sides of the optical phase conjugator, and attaining a reduction in the size of the optical transmission system including the optical phase conjugator.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
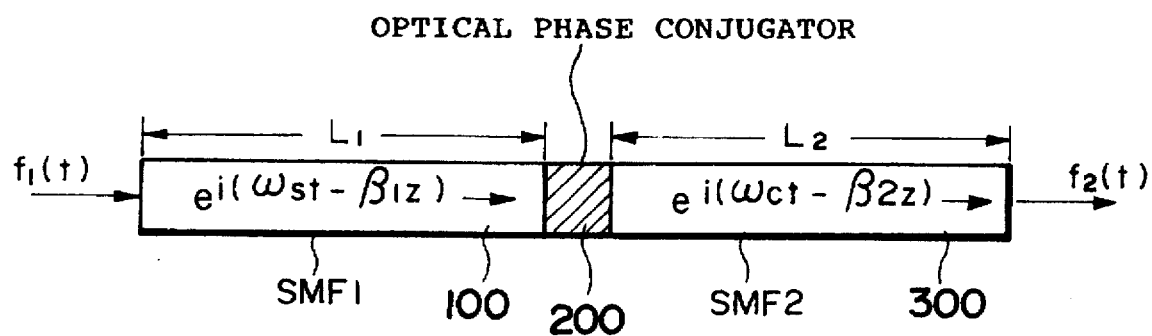
FIG. 1 is a view showing the arrangement of a distortion compensation type transmission path using an optical phase conjugator.

Embodiments of the present invention will be described below with reference to the accompanying drawings. Note that the same reference numerals denote the same parts throughout the drawings, and a repetitive description will be avoided.

An optical transmission system and an optical phase conjugator used therein according to an embodiment of the present invention will be described below with reference to FIGS. 2 to 4.

Figure 2:
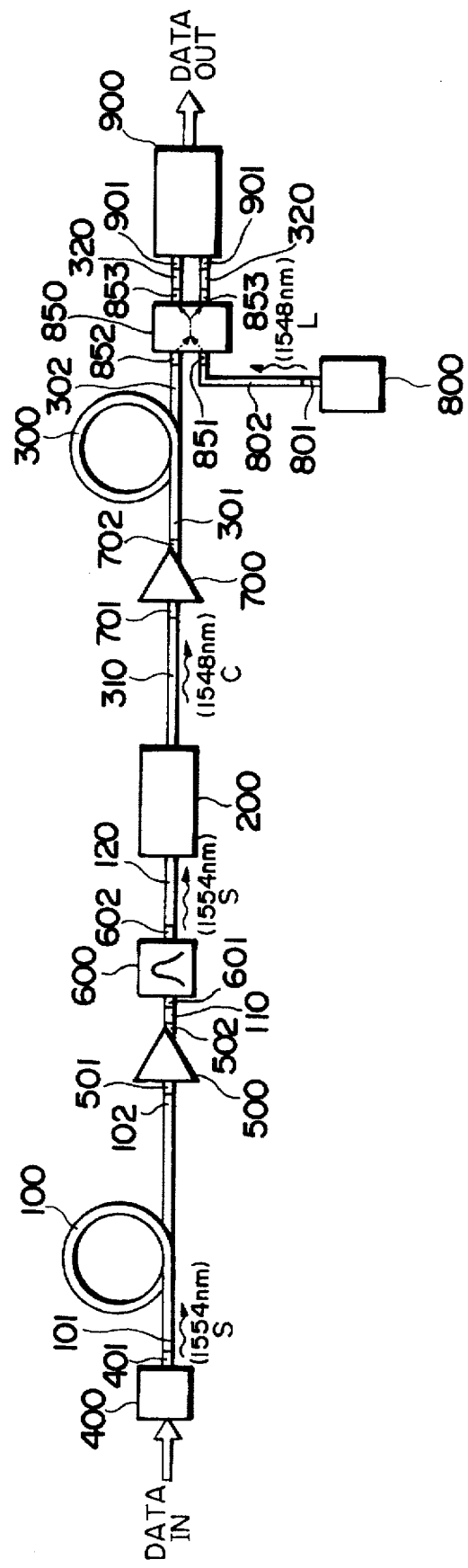
FIG. 2 is a block diagram showing the arrangement of an optical transmission system according to an embodiment of the present invention.

The optical transmission system shown in FIG. 2 according to an embodiment of the present invention comprises:

a) an optical emitter (e.g., a signal LD) 400 for generating first light (original signal light) S serving as a transmission target and having a first light frequency (e.g., wavelength $\lambda_S$=1,554 nm) on the basis of input data (e.g., NRZ (non-return to zero)-data);

b) a first optical fiber (e.g., a single-mode fiber (SMF)) 100 having an input end 101 optically connected to an output terminal 401 of the optical emitter 400 and serving to guide the original signal light S;

c) a first optical amplifier (e.g., an Er-containing fiber amplifier (EDFA)) 500 having an input terminal 501 optically connected to an output end 102 of the SMF 100 and serving to amplify and output the original signal light S transmitted along the SMF 100;

d) an optical filter 600 having an input terminal 601 optically connected to an output end 502 of the first optical amplifier 500 via an optical fiber 110 and serving to selectively transmit light, of the light output from the first optical amplifier 500, which has almost the same wavelength as the wavelength $\lambda_S$;

e) an optical phase conjugator 200 of the present invention, which is optically connected to an output terminal 602 of the optical filter 600 via an optical fiber 120 and serves to efficiently generate third light (phase-conjugate light) C having a third light frequency (e.g., $\lambda_C$=1,548 nm) on the basis of the original signal light S by using a nonlinear optical effect, as will be described later;

f) a second optical amplifier (e.g., an Er-containing fiber amplifier (EDFA)) 700 having an input terminal 701 optically connected to the optical phase conjugator 200 via an optical fiber 310 and serving to amplify and output the phase-conjugate light C;

g) a second optical fiber (e.g., a single-mode fiber (SMF)) 300 having an input end 301 optically connected to an output terminal 702 of the second optical amplifier 700 and serving to guide the phase-conjugate light C;

h) a local light source (e.g., a local LD) 800 for generating fifth light L having almost the same light frequency (e.g., wavelength $\lambda_L$=1,548 nm) as the light frequency of the phase-conjugate light C;

i) a fourth optical coupler 850 having a first terminal 851 optically connected to an output terminal 801 of the local light source 800 via an optical fiber 802, a second terminal 852 optically connected to an output end 302 of the optical fiber 300, and third terminals 853 from which coupled light of the phase-conjugate light C transmitted along the optical fiber 300 and the fifth light L is output; and j) an optical receiver (e.g., heterodyne receiver) 900 having input terminals 901 optically connected to the third terminals of the fourth optical coupler 850 via optical fibers 220 and serving to detect the intensity of the phase-conjugate light C transmitted along the optical fiber 300 and output the resultant data.

The optical phase conjugator of the present invention will be described in detail next.

Figure 3:
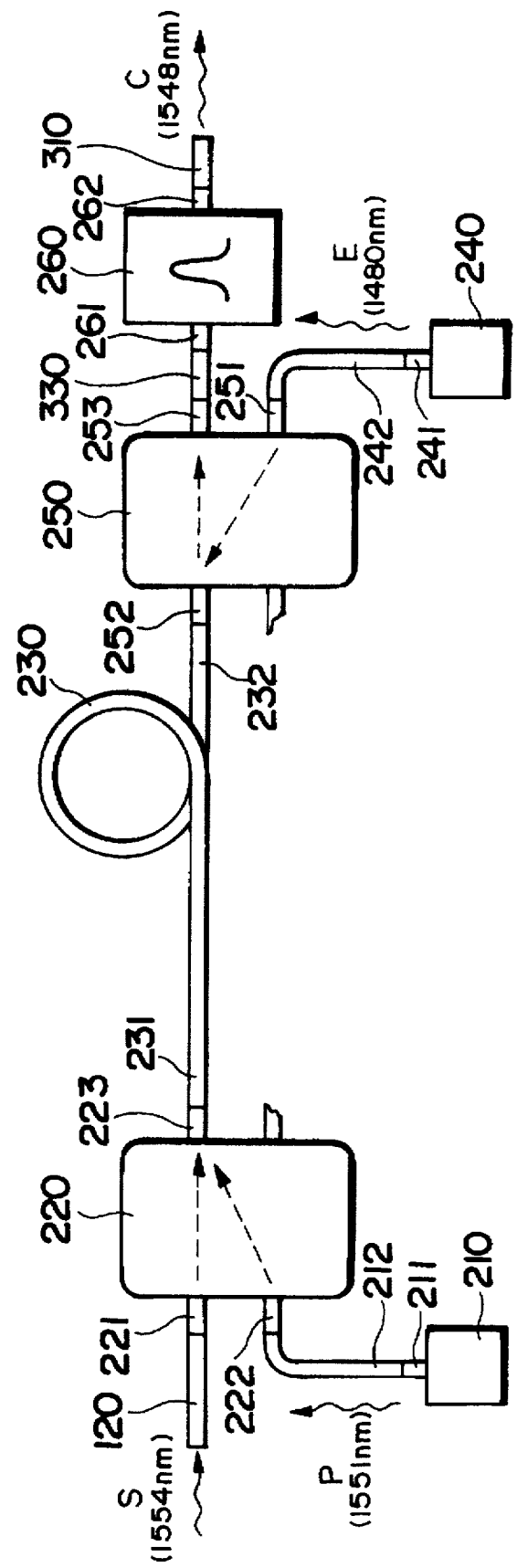
FIG. 3 is a block diagram showing the arrangement of an optical phase conjugator according to an embodiment of the present invention.

FIG. 3 shows the arrangement of the optical phase conjugator 200 according to an embodiment of the present invention. As shown in FIG. 3, the optical phase conjugator 200 of this embodiment comprises:

i) a first light source (e.g., a pump LD) 210 for generating second light (pumping light) P having a second light frequency (e.g., wavelength $\lambda_P$=1,551 nm);

ii) a first optical coupler 220 having a first terminal 221 optically connected to the optical fibers 100, 110, and 120 to receive the original signal light S (e.g., wavelength $\lambda_S$=1,554 nm), a second terminal 222 optically connected to an output terminal 211 of the first light source 210 via an optical fiber 212 to receive the pumping light P, and a third terminal 223 from which coupled light of the original signal light S and the pumping light P is output;

iii) an optical nonlinear medium (e.g., a distributed index Er-containing fiber) 230 having an input end 231 optically connected to the third terminal 223 of the first optical coupler 220 and serving to generate the phase-conjugate light C (e.g., wavelength $\lambda_C=1,548$ nm) by a nonlinear optical effect on the basis of the input original signal light S and the pumping light P, the optical nonlinear medium containing an element (e.g., Er) which is activated (excited) upon irradiation of fourth light (activation light) E having a fourth light frequency (e.g., wavelength $\lambda_E=1,480$) and has an amplification function with respect to the pumping light P;

iv) a second light source (e.g., an activate LD) 240 for generating activation light (e.g., Er pumping light) E;

v) a second optical coupler 250 having a first terminal 251 optically connected to the second light source 240 via an output terminal 241 and an optical fiber 242 to receive the activation light E, a second terminal 252 optically connected to an output end 232 of the optical nonlinear medium 230 and serving to receive light output from the optical nonlinear medium 230 and output the activation light E to the optical nonlinear medium 230, and a third terminal 253 from which light input from the second terminal 252 is output; and vi) an optical filter 260 having an input terminal 261 optically connected to the third terminal 253 of the second optical coupler 250 via an optical fiber 330, and an output terminal 262 optically connected to the optical fibers 300, 310, and 320, and serving to selectively transmit light, of the light output from the optical nonlinear medium 230, which has almost the same wavelength as the wavelength $\lambda_C$ of the phase-conjugate light C.

The original signal light S is input to the optical phase conjugator 200 via the optical fiber 120 connected to the terminal 221, and the phase-conjugate light C is output from the optical phase conjugator 200 via the optical fiber 310 connected to the optical filter 260. As the optical nonlinear medium 230, a dispersion-shifted optical fiber containing the above element (preferably Er) in the core is preferably used. Furthermore, it is preferable that the zero-dispersion wavelength ($\lambda_0$) of light from the optical nonlinear medium 230 be almost the same as the wavelength of the pumping light P. Note that all the optical fibers are preferably single-mode optical fibers.

Figure 4:
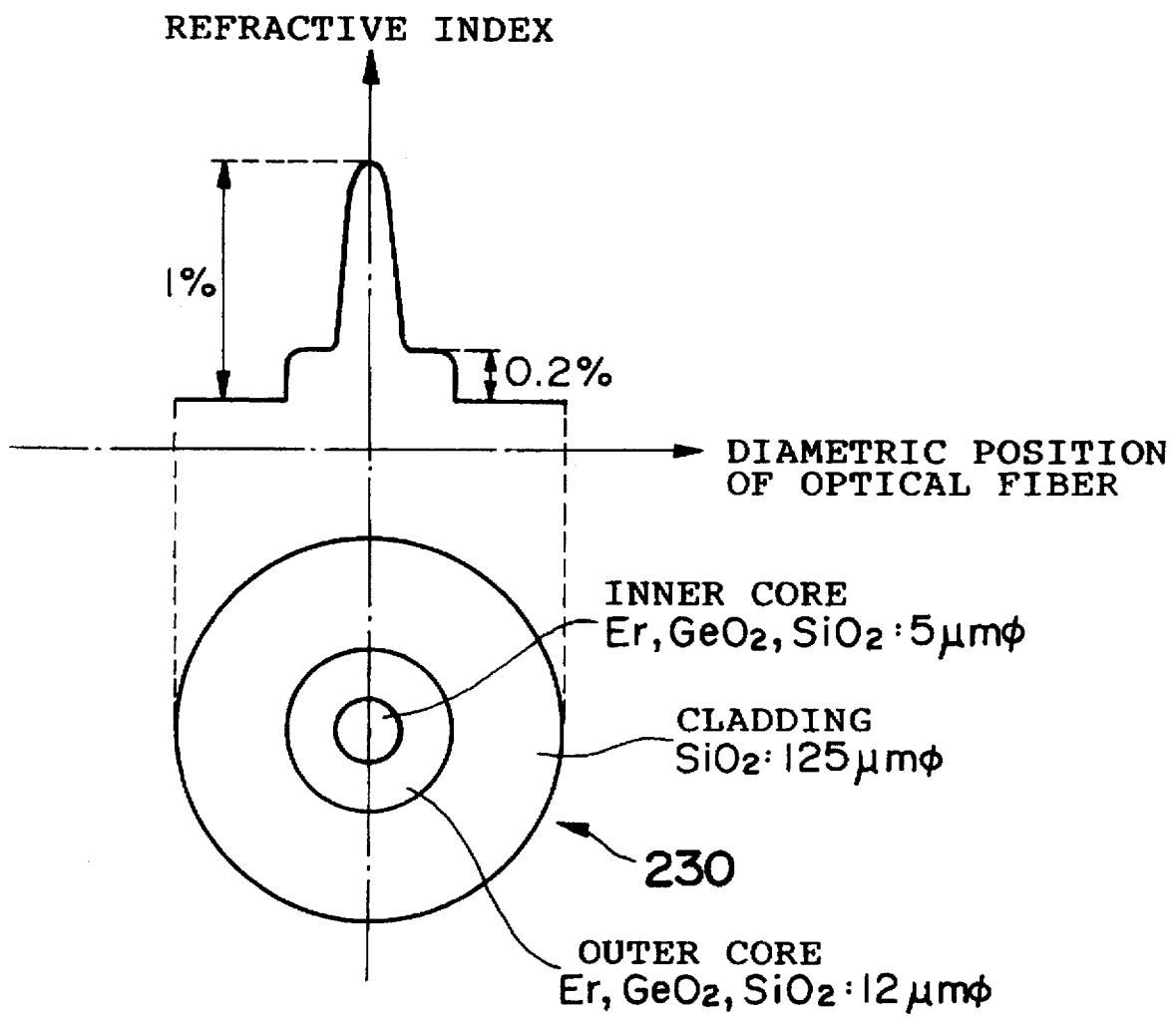
FIG. 4 is a view for explaining a distributed index Er-containing fiber suitably used for the optical phase conjugator of the present invention.

FIG. 4 is a view for explaining a distributed index Er-containing fiber 230 suitably used for the present invention. Table 1 shows various characteristics of the distributed index Er-containing fiber 230 in FIG. 4.

TABLE 1

| Specific Refractive Index Difference (Inner Layer) (%) | 1.0 |
| --- | --- |
| Core Diameter (Outer Layer) (µm) | 12.0 |
| Mode Field Diameter (at 1,550 nm) (µm) | 8.0 |
| Zero-Dispersion Wavelength (nm) | 1,551 |
| Er concentration (ppm by weight) | 1.0 |

The distributed index Er-containing fiber 230 shown in FIG. 4 has a stepped refractive index distribution and a mode field diameter of 8 µm. The light amplification effect of the distributed index Er-containing fiber 230 corresponds to at least an amplification ability to compensate for attenuation of signal light which is caused when it propagates in the fiber 230. That is, the intensity of signal light (phase-conjugate light C) output from the fiber 230 is at least equal to, or higher than the intensity of signal light (original signal light S) input to the fiber 230.

The optical phase conjugator 200 of this embodiment, which uses the distributed index Er-containing fiber 230 shown in FIG. 4, generates phase-conjugate light C in the following manner.

The original signal light S (wavelength $\lambda_S=1,554$ nm) is input from the first terminal 221 to the optical coupler 220 via the optical fiber 120. The pumping light P (wavelength $\lambda_P=1,551$ nm) generated by the light source 210 is input from the terminal 222 via the optical fiber 212. The first optical coupler 220 couples the light S and the light P to output the coupled light from the terminal 223. The light (the original signal light S and the pumping light P) output from the first optical coupler 220 is input to the distributed index Er-containing fiber 230. In this case, from the viewpoint of generation of phase-conjugate light, it is preferable that the directions of planes of polarization of the original signal light S and the pumping light P input to the distributed index Er-containing fiber 230 be aligned. In this embodiment, therefore, as the optical fiber 120 and the optical fiber 212, polarization-preserving fibers (plane-of-polarization control fibers) are preferably used. Note that if the planes of polarization of the pumping light P output from the light source 210 are aligned, and the optical fiber 120 is not so long as to cause great dispersion of the planes of polarization of the original signal light S, general optical fibers may be used as the above optical fibers.

The light input to the distributed index Er-containing fiber 230 propagates in the fiber 230 while generating the phase-conjugate light C (wavelength $\lambda_C=1,548$ nm) owing to the nonlinear optical effect in the fiber 230. Meanwhile, Er activation light E (wavelength $\lambda_E=1,480$ nm) generated by the light source 240 is input to the fiber 230 via the optical fiber 242 and the optical coupler 250 so as to activate (excite) Er in the fiber 230. Thus, Er is provided with an amplification function. As a result, the original signal light S, the pumping light P, and phase-conjugate light C propagate in the fiber 230 while the attenuated portions thereof are compensated by the amplification effect based on induced emission of the activated Er in the fiber 230.

The light (the original signal light S, the pumping light P, and phase-conjugate light C) output from the fiber 230 is input from the terminal 252 to the second optical coupler 250 and is output from the terminal 253. The above light output from the second optical coupler 250 is input to the optical filter 260 via the optical fiber 330. The optical filter 260 selectively transmits light having almost the same wavelength as that of the phase-conjugate light C, and outputs new signal light (phase-conjugate light C) as an output signal from the optical phase conjugator 200.

As described above, in the optical transmission system having the optical phase conjugator 200 of the present invention, the original signal light S whose waveform has been distorted while it was transmitted along the transmission path 100 is incident on the optical phase conjugator 200. The optical phase conjugator 200 then efficiently generates the phase-conjugate light C having a wavelength different from that of the original signal light S as new signal light. The new signal light is supplied to the next transmission path 300. Therefore, in the optical transmission system of the present invention, while the phase-conjugate light C is transmitted along the transmission path 300, distortion of the signal waveform is corrected, thus realizing a reduction in the distortion of the signal waveform. Furthermore, in the present invention, the phase-conjugate light C generating efficiency of the optical phase conjugator 200 is much higher than that of the prior art. Therefore, increases in the lengths of the transmission paths 100 and 300 and a decrease in the size of the optical phase conjugator 200 can be realized.

An improvement in the phase-conjugate light C generating efficiency of the optical phase conjugator of the present invention will be analyzed next.

Since the optical phase conjugator for executing the wavelength dispersion compensation method using generation of phase-conjugate light has the above arrangement, the following characteristics are Obtained.

A phase-conjugate light generating efficiency η{= (intensity of phase-conjugate light)/(intensity of input signal light)} in an optical fiber in a case wherein a pumping light wavelength ($\lambda_P$) is equal to the zero-dispersion wavelength ($\lambda_0$) of the optical fiber is given by $$\eta(z) = \Phi^2(z) \cdot \exp(-\alpha \cdot z) \tag{2}$$

where $\alpha$ is the light attenuation rate per unit length of the optical fiber, $\Phi(z)$ is the phase rotation amount based on the Kerr effect, and z is the length of the optical fiber.
In this case, $$\Phi(z) = \gamma \cdot <P_P> \cdot z \tag{3}$$

where $\gamma$ is the nonlinear coefficient, $P_P$ is the pumping light intensity, and $<P_P>$ is the route average of pumping light intensity.

$$\gamma = k \cdot n^{(2)} / A_{\mathit{eff}} \tag{4}$$

wherein k is the wave number, $n^{(2)}$ is the nonlinear refractive index, and $A_{\mathit{eff}}$ is the effective sectional area of the core.

$$<P_P> = P_P \cdot [1 - \exp(-\alpha \cdot z)]/(\alpha \cdot z) \tag{5}$$

An optical fiber length $Z_{OPT}$ with which the phase-conjugate light generating efficiency is maximized is given as follows by using equation (2). Since $d\eta n(z)/dz = 0$, $$Z_{OPT} = \ln(3)/\alpha \tag{6}$$

A maximum value $\eta_{MAX}$ of the phase-conjugate light generating efficiency is given by $$\eta_{MAX} = (4/27) \cdot (\gamma P_P/\alpha)^2 \tag{7}$$

The generating efficiency of an optical phase conjugator using a conventional Ge-containing silica fiber will be analyzed first.

Providing that a conventional Ge-containing silica fiber containing no element having an amplification function is used, together with transmission light having a wavelength of about 1.5 μm, substitutions of $\alpha = 0.2$ [dB/km] and $\gamma = 3.0$ [W$^{-1}$·km$^{-1}$] into equations (6) and (7) yield $Z_{OPT} \approx 23.9$ [km]

$\eta_{MAX} \approx 625 \times P_P^2$

Figure 5:
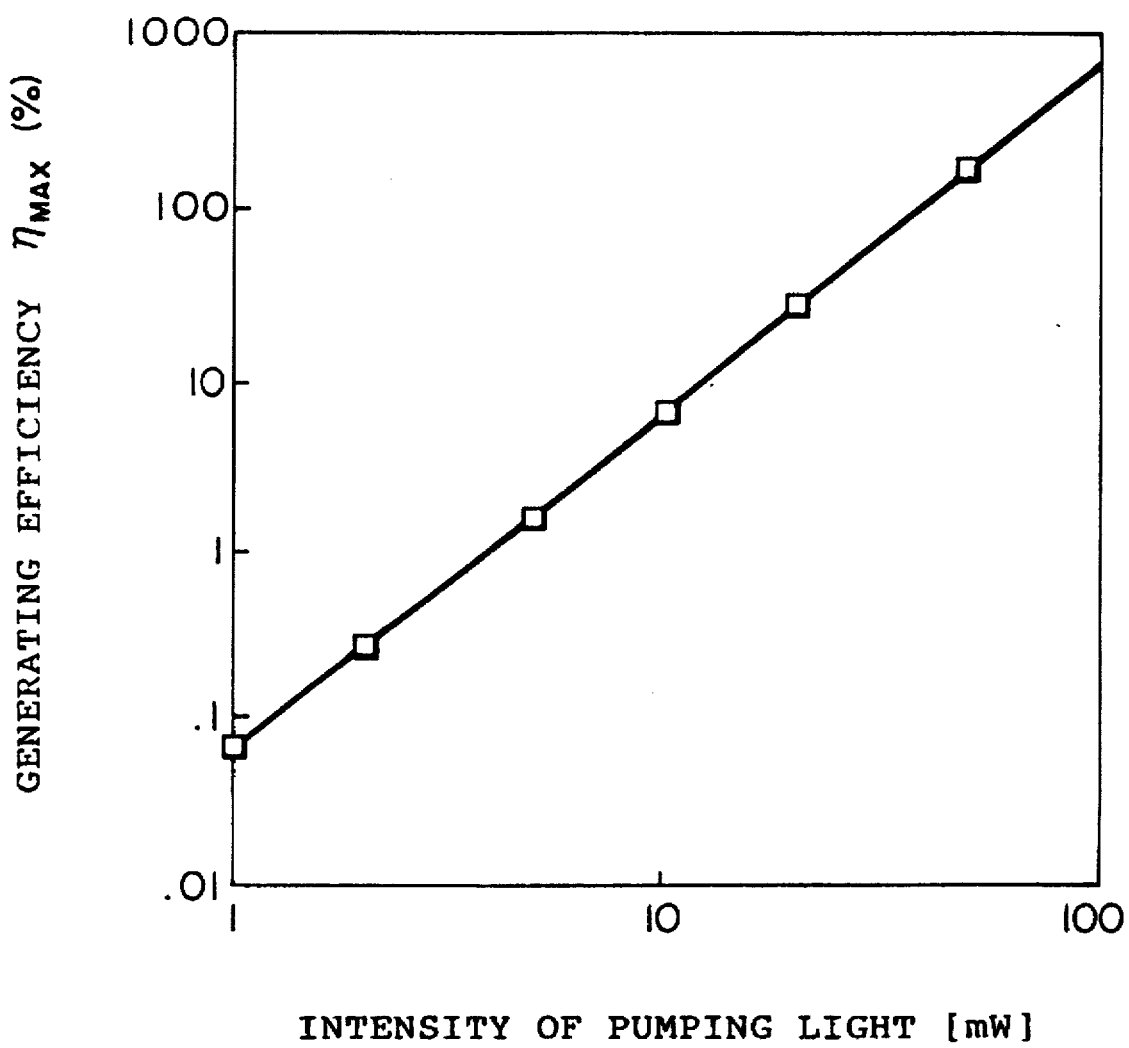
FIG. 5 is a graph showing the relationship between the pumping light intensity and the phase-conjugate light generating efficiency in a conventional optical phase conjugator.

FIG. 5 is a graph showing the relationship between the pumping light intensity $P_P$ and the generating efficiency $\eta_{MAX}$ in equation (7) in a case wherein $\alpha = 0.2$ [dB/km] and $\gamma = 3.0$ [W$^{-1}$·km$^{-1}$]. As is apparent from FIG. 5, the conventional phase-conjugate light requires a light source for generating pumping light with $P_P \approx 40$ mW to achieve $\eta_{MAX} = 1 = 100\%$. As a reference value indicating the size of an optical phase conjugator, a $P_P z$ value (to be referred to as a $P_P z$ product value) is conveniently used. In the conventional optical phase conjugator, $$P_P z = (27^{1/2}/2) \cdot (\ln(3)/\gamma) \cdot \eta_{MAX}^{1/2} \tag{8}$$

If $\gamma = 3.0$ [W$^{-1}$·km$^{-1}$] is assumed, the $P_P z$ product value is given by $$P_P z = 951 \, \eta_{MAX}^{1/2} \tag{9}$$

The generating efficiency of the optical phase conjugator of the present invention, which uses the distributed index Er-containing fiber shown in FIG. 4, will be described next.

As described above, the light amplification effect of the distributed index Er-containing fiber 230 according to the present invention corresponds to at least an amplification ability to compensate for attenuation of signal light which is caused when it propagates in the fiber 230.

If, therefore, the wavelength ($\lambda_P$) of pumping light is set to be qual to the zero-dispersion wavelength ($\lambda_0$) of the optical fiber in the fiber 230 shown in FIG. 4, the generating efficiency η in the fiber 230 is given as follows, providing that $\alpha = 0$ in equation (2), $$\eta(z) = \Phi^2(z) \tag{10}$$

where $\Phi(z)$ is the phase rotation amount based on the Kerr effect, and z is the length of the optical fiber. In addition, since the pumping light undergoes no attenuation owing to the amplification effect in the fiber 230, providing that $\alpha = 0$ in equation (5), $$<P_P> = P_P \tag{11}$$

Therefore, the phase-conjugate light generating efficiency η0 is given by $$\eta = (\gamma P_P z)^2 \tag{12}$$

The $P_P z$ product value is given by $$P_P z = \eta^{1/2}/\gamma \tag{13}$$

In this case, providing that the wavelength of light transmitted along a general Ge-containing silica fiber is about 1.5 μm, a substitution of $\gamma = 3.0$ [W$^{-1}$·km$^{-1}$] into equation (13) yields $$P_P z = 333 \, \eta^{1/2} \tag{14}$$

Therefore, according to the optical phase conjugator of the present invention, the same generating efficiency as that of the conventional optical phase conjugator can be attained with about ⅓ the size thereof.

Figure 6:
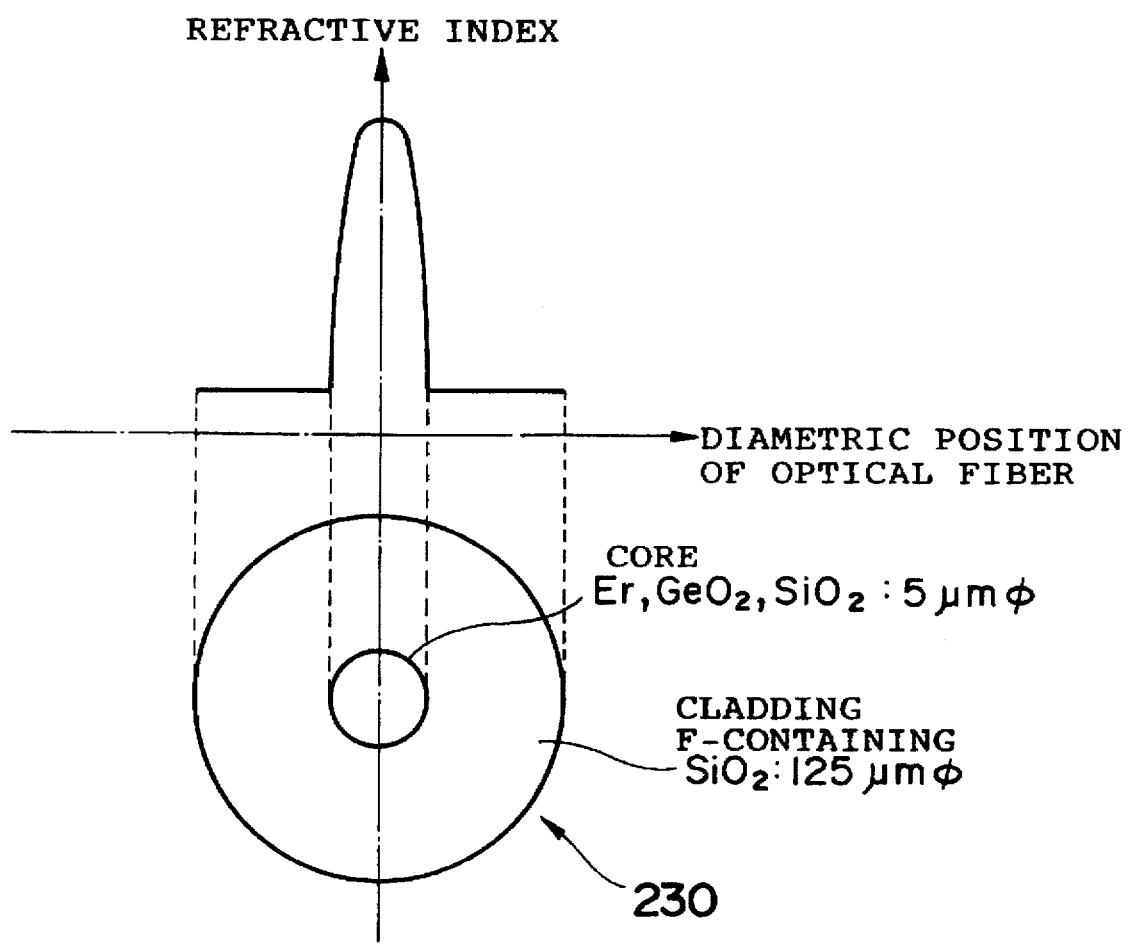
FIG. 6 is another view for explaining a distributed index Er-containing fiber suitably used for the optical phase conjugator of the present invention.

FIG. 6 is a view for explaining another example of the distributed index Er-containing fiber 230 suitably used in the present invention. Table 2 shows various characteristics of the distributed index Er-containing fiber 230 in FIG. 6.

TABLE 2

| Specific Refractive Index Difference (%) | 1.4 |
|---|---|
| Core Diameter (μm) | 5.0 |
| Mode Field Diameter (at 1,550 nm) (μm) | 5.0 |
| Zero-Dispersion Wavelength (nm) | 1,551 |
| Er Concentration (ppm by weight) | 1.0 |

The distributed index Er-containing fiber 230 shown in FIG. 6 is an optical fiber having a large NA (numerical aperture). Note that when an optical fiber having a large NA is to be used, the specific refractive index difference is preferably 1.2% or more.

The optical fiber shown in FIG. 6 is different from that shown in FIG. 4 in that it has a one-layer core (diameter=5 μm), and the specific refractive index difference is 1.4%, which is larger than that of a general optical fiber. As a result, the mode field diameter of the optical fiber shown in FIG. 6 is 5 μm, and hence the concentration degree of light guided to the central portion of the core increases. Therefore, when the optical fiber shown in FIG. 6 is used, the phase-conjugate light generating efficiency improves as compared with the case wherein the optical fiber shown in FIG. 4 is used.

Similarly, the generating efficiency of the phase-conjugate light of the present invention, which used the distributed index Er-containing fiber shown in FIG. 6, will be analyzed.

Since the nonlinear coefficient γ is inversely proportional to the square of the mode field diameter according to equation (4), it can be considered according to equation (13) that the $P_P z$ product value is inversely proportional to the square of the mode field diameter. That is, when the optical fiber shown in FIG. 6 is used, the $P_P z$ product value is given by $$P_P z = 133 \, \eta^{1/2} \tag{15}$$

Therefore, according to the optical phase conjugator of the present invention, which used the distributed index Er-containing fiber shown in FIG. 6, the conversion efficiency as that of the conventional optical phase conjugator can be attained with about ⅛ the size thereof. That is, if pumping light intensity $P_P=10$ [mW], phase-conjugate light generating efficiency η=100% can be attained with z≈13 [km].

Figure 7:
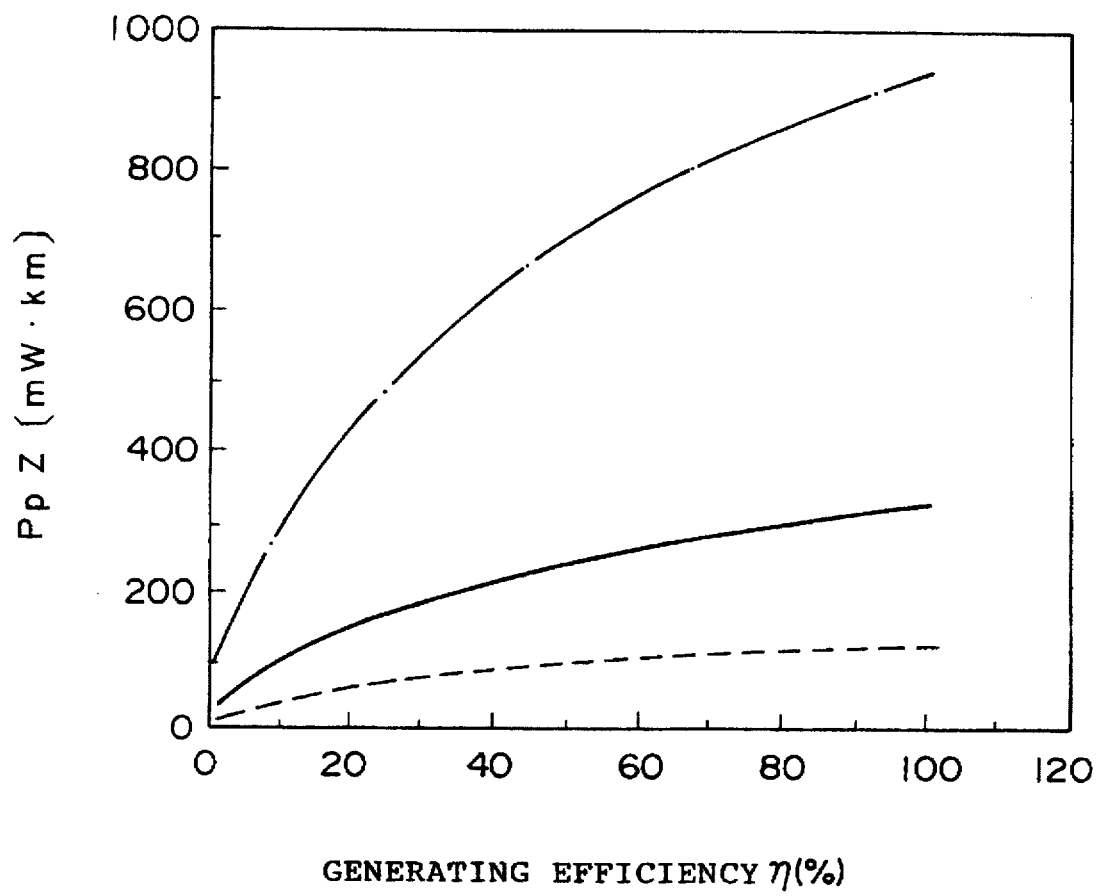
FIG. 7 is a graph showing the relationships between the phase-conjugate light generating efficiency and the $P_P z$ product value in the optical phase conjugators of the present invention and the conventional optical phase conjugator.

FIG. 7 is a graph showing the relationships between the generating efficiency η and the $P_P z$ product value in the optical phase conjugator of the present invention which uses the distributed index Er-containing fiber shown in FIG. 4, the optical phase conjugator of the present invention which uses the distributed index Er-containing fiber shown in FIG. 6, and the conventional optical phase conjugator. As is apparent from FIG. 7 as well, the phase-conjugate light generating efficiency of the optical phase conjugator of the present invention can be improved as compared with the conventional optical phase conjugator.

From the viewpoint of Er activating efficiency and noise factor (NF), the concentration of Er to be added in the core of the distributed index Er-containing fiber 230 according to the present invention is preferably 0.1 to 10 ppm by weight, more preferably 0.5 to 2 ppm by weight, and most preferably about 1 ppm by weight.

Figure 8:
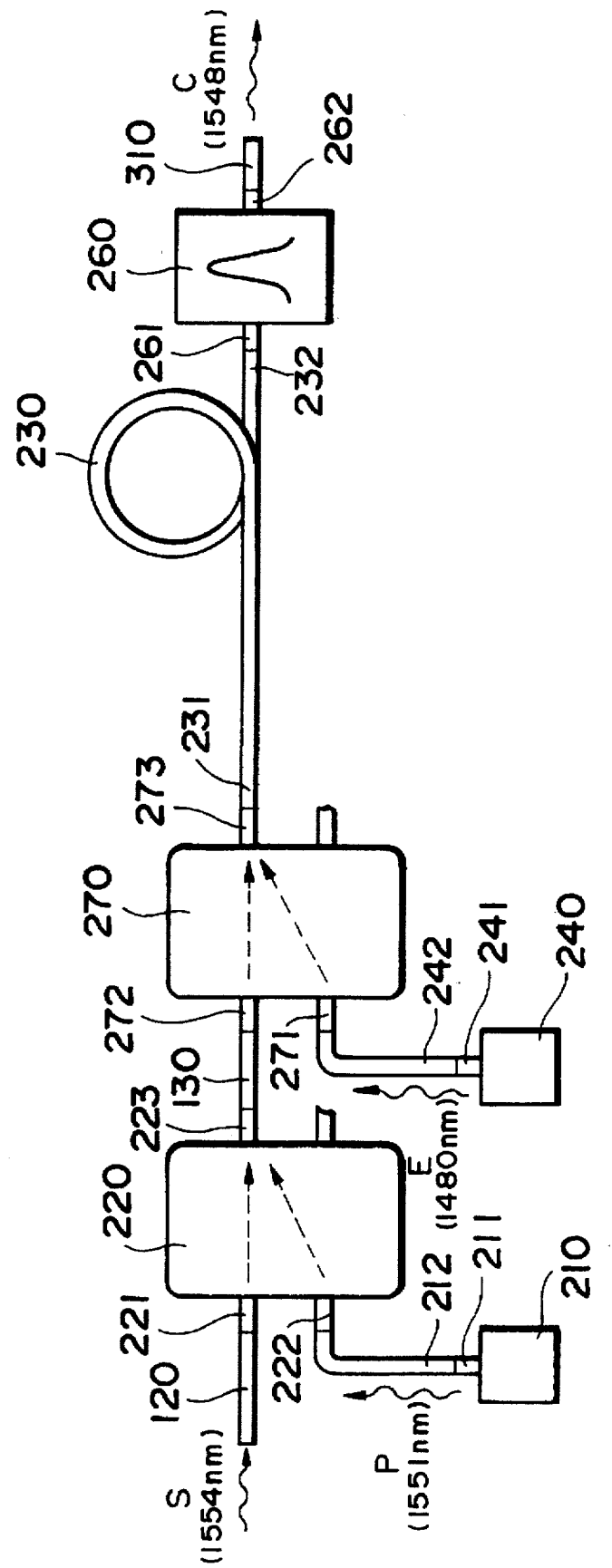
FIG. 8 is a block diagram showing the arrangement of an optical phase conjugator according to another embodiment of the present invention.

FIG. 8 shows the arrangement of an optical phase conjugator 200 according to another embodiment of the present invention. In the optical phase conjugator shown in FIG. 3, the activation light E is incident from the output end 232 onto the fiber 230 in the opposite direction to the propagating direction of the original signal light S (backward pumping). In contrast to this, in the optical phase conjugator shown in FIG. 8, activation light E is incident from an input end 231 onto a fiber 230 in the same direction as the propagating direction of original signal light S (forward pumping).

An optical phase conjugator 200 of this embodiment comprises i) a first light source 210 for generating pumping light P (e.g., wavelength $\lambda_P=1,551$ nm);

ii) a first optical coupler 220 having a first terminal 221 optically connected to optical fibers 100, 110, and 130 to receive the original signal light S (e.g., wavelength $\lambda_S=1,554$ nm), a second terminal 222 optically connected to an output terminal 211 of the first light source 210 via an optical fiber 212 to receive the pumping light P, and a third terminal 223 from which coupled light of the original signal light S and the pumping light P is output;

iii) a second light source 240 for generating the activation light E (e.g., $\lambda_E=1,480$ nm);

iv) a second optical coupler 270 having a first terminal 271 optically connected to an output terminal 241 of the second light source 240 via an optical fiber 242 to receive the activation light E, a second terminal 272 optically connected to the third terminal 223 of the first optical coupler 220 via an optical fiber 130 to receive the light S and the light P output from the first optical coupler 220, and a third terminal 273 which is optically connected to an input end 231 of an optical nonlinear medium 230, and from which coupled light of the original signal light S, the pumping light P, and activation light E is output;

v) an optical nonlinear medium (e.g., a distributed index Er-containing fiber) 230 having an input end 231 optically connected to the third terminal 273 of the second optical coupler 270 and serving to generate phase-conjugate light C (e.g., wavelength $\lambda_C=1,548$ nm) by using a nonlinear optical effect on the basis of the input original signal light S and pumping light P, the optical nonlinear medium containing an element (e.g., Er) which is activated (excited) by irradiation of the activation light E and has an amplification function with respect to the pumping light P in an active state; and vi) an optical filter 260 having an input terminal 261 optically connected to an output end 232 of the optical nonlinear medium 230 to receive light output from the optical nonlinear medium 230, and an output terminal 262 optically connected to the optical fibers 300, 310, and 320 and serving to selectively transmit light, of the light output from the optical nonlinear medium 230, which has almost the same wavelength as a wavelength $\lambda_C$ of phase-conjugate light C.

The original signal light S is input to the optical phase conjugator 200 of this embodiment via the optical fiber 120 connected to the terminal 221, and the phase-conjugate light C is output from the optical phase conjugator 200 via the optical fiber 310 connected to the optical filter 260.

Similar to the above embodiment, in this embodiment, both the distributed index Er-containing fibers shown in FIGS. 4 and 6 can be used.

In the optical phase conjugator 200 of the present invention, the following phase-conjugate light C is generated in the following manner.

The original signal light S (wavelength $\lambda_S=1,554$ nm) is input from the terminal 221 to the first optical coupler 220 via the optical fiber 120. In addition, the pumping light P (wavelength $\lambda_P=1,551$ nm) generated by the light source 210 is input to the optical coupler 220 via the optical fiber 212 and the terminal 222. The optical coupler 220 couples the light S and the light P input in the above manner, and outputs the coupled light from the terminal 223. The light (the original signal light S and the pumping light P) output from the first optical coupler 220 is input to the optical coupler 270 via the optical fiber 130 and the terminal 272. Meanwhile, the Er activation light E (wavelength $\lambda_E=1,480$ nm) generated by the light source 240 is input to the optical coupler 270 via the optical fiber 242 and the terminal 271. The light (the original signal light S, the pumping light P, and the activation light E) output from the optical coupler 270 is input to the distributed index Er-containing fiber 230.

The light input to the distributed index Er-containing fiber 230 propagates in the fiber 230 while generating the phase-conjugate light C (wavelength $\lambda_C=1,548$ nm) by a nonlinear optical effect in the fiber 230. Meanwhile, since the Er activation light E generated by the light source 240 is input to the fiber 230, Er in the fiber 230 is activated (excited), and an amplification function is provided. As a result, the original signal light S, the pumping light P, and phase-conjugate light C propagate in the fiber 230 while the attenuated portions thereof are compensated by the amplification effect based on induced emission of the activated Er in the fiber 230.

The light (the original signal light S, the pumping light P, the Er activation light E, and the phase-conjugate light C) output from the fiber 230 is input to the optical filter 260. The optical filter 260 selectively transmits light having almost the same wavelength as that of the phase-conjugate light C, and outputs new signal light (phase-conjugate light C) as an output signal from the optical phase conjugator 200.

In this manner, in the optical phase conjugator 200 of this embodiment as well, distortion of the waveform of the original signal light S which has been caused in the transmission path 100 before it was incident on the optical phase conjugator 200 is corrected while the light is transmitted to the next transmission path 300. With this operation, the phase-conjugate light C which allows a reduction in distortion of signal waveform and has a wavelength different from that of the original signal light S can be supplied as new signal light to the next transmission path 300. Furthermore, in the optical phase conjugator 200 of this embodiment as well, the phase-conjugate light C generating efficiency is much higher than that in the prior art. This allows increases in the lengths of the transmission paths 100 and 300 and a decrease in the size of the optical phase conjugator 200.

In the present invention, the difference in wavelength between the original signal light S and the pumping light P is preferably about 4 nm or less. Note that this difference is a reference value but does not limit the present invention. In addition, the wavelengths of the respective light beams in the above embodiment do not limit the present invention.

Figure 9:
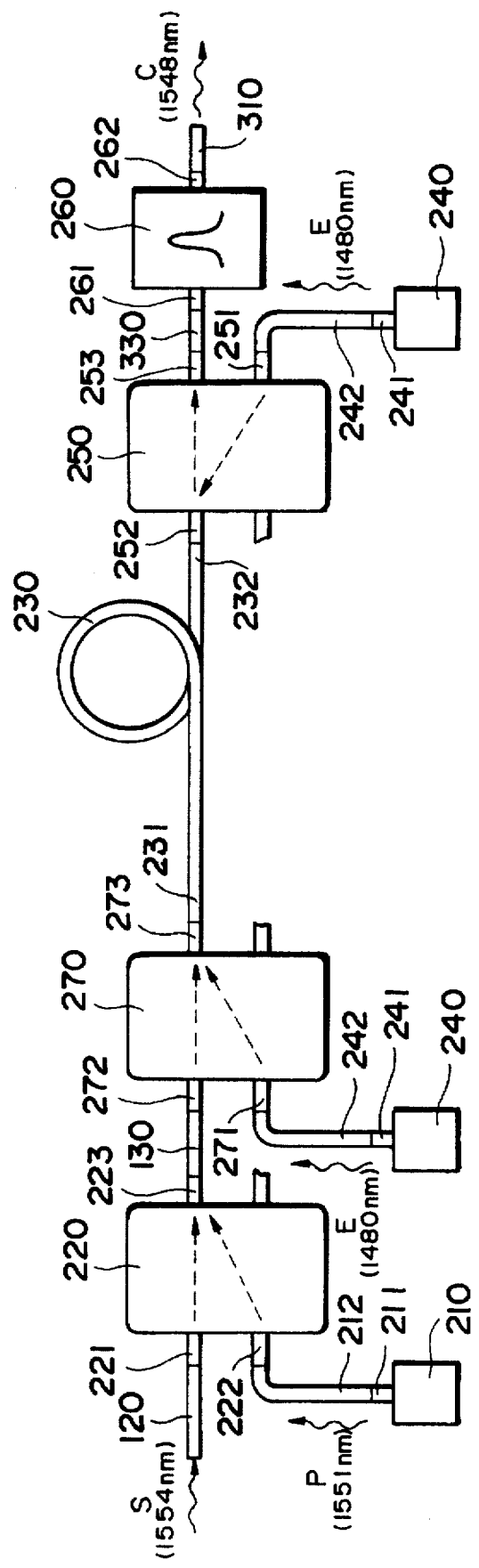
FIG. 9 is a block diagram showing the arrangement of an optical phase conjugator according to still another embodiment of the present invention.

The present invention is not limited to the above embodiment, and various modifications can be made. For example, as a scheme of supplying the activation light E to the optical nonlinear medium 230 according to the present invention, a bidirectional pumping scheme as a combination of the forward pumping scheme shown in FIG. 8 and the backward pumping scheme shown in FIG. 8 may be used. FIG. 9 shows an optical phase conjugator 200 using the bidirectional pumping scheme according to still another embodiment of the present invention. The arrangement of the optical phase conjugator shown in FIG. 9 is the same as that of the optical phase conjugator shown in FIG. 3 except that it has two second light sources 240 for generating activation light E and both the second optical coupler 250 shown in FIG. 3 and the second optical coupler 270 shown in FIG. 8. In the optical phase conjugator shown in FIG. 9, an element in an optical nonlinear medium 230 is activated by the activation light E incident from both an input end 231 and an output end 232. With this operation, similar to the optical phase conjugators shown in FIGS. 3 and 8, phase-conjugate light C can be generated very efficiently by the optical phase conjugator shown in FIG. 9.

In addition to the components described in the above embodiments, for example, lead may be added to the composition of an optical nonlinear medium (e.g., the core of an optical fiber) for generating the phase-conjugate light C. With this addition, an increase in nonlinear constant can be attained, and more efficient generation of the phase-conjugate light C can be expected.

As has been described in detail above, according to the optical phase conjugator of the present invention, since an optical nonlinear medium having an amplification effect is used as a medium for generating phase-conjugate light, the phase-conjugate light generating efficiency can be greatly improved as compared with the conventional optical phase conjugator. Therefore, phase-conjugate light having the same intensity as that attained by the conventional optical phase conjugator can be attained with a small apparatus arrangement, or phase-conjugate light having a higher intensity can be generated with the same apparatus arrangement as that of the conventional optical phase conjugator.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 157661/1994 filed on Jul. 8, 1994 is hereby incorporated by reference.

What is claimed is:

1. An optical phase conjugator comprising:
    an optical nonlinear medium for receiving first light having a first light frequency and second light having a second light frequency, and outputting a third light having a third light frequency generated by a nonlinear optical effect based on the first light and the second light, said optical nonlinear medium containing an element to be activated upon irradiation of fourth light having a fourth light frequency and having an amplification function with respect to at least the second light in an active state;
    a first optical coupler having a first terminal to which the first light is input, a second terminal to which the second light is input, and a third terminal from which coupled light of the first light and the second light is output, the third terminal being optically connected to an input end of said optical nonlinear medium; and
    a second optical coupler, optically connected to at least one end selected from the group consisting of the input end and an output end of said optical nonlinear medium, for inputting the fourth light into said medium, said second optical coupler having a first terminal to which the fourth light is input, a second terminal to which light output from said optical nonlinear medium is input and from which the fourth light is output, and a third terminal from which light input from the second terminal is output, the second terminal being optically connected to the output end of said optical nonlinear medium.

2. A conjugator according to claim 1, wherein the first light is original signal light, the second light is pumping light for generating the third light together with the first light, the third light is phase-conjugate light, and the fourth light is activation light for activating the element in said optical nonlinear medium.

3. A conjugator according to claim 1, wherein the following relationship is established between the first, second, and third light frequencies:

$$v_3 = 2v_2 - v_1$$

where $v_1$ is the first light frequency, $v_2$ is the second light frequency, and $v_3$ is the third light frequency.

4. A conjugator according to claim 1, wherein the fourth light frequency is higher than the first light frequency, the second light frequency, and the third light frequency.

5. A conjugator according to claim 1, wherein said optical nonlinear medium is an optical waveguide, and the element is a rare earth element which enables to be activated to amplify light incident thereon by induced emission.

6. A conjugator according to claim 1, further comprising a first light source, optically connected to the second terminal of said first optical coupler, for generating the second light, and a second light source, optically connected to the first terminal of said second optical coupler, for generating the fourth light.

7. A conjugator according to claim 1, wherein said optical nonlinear medium is a dispersion-shifted optical fiber.

8. A conjugator according to claim 1, wherein said optical nonlinear medium is a dispersion-shifted optical fiber having a specific refractive index difference of not less than 1%.

9. A conjugator according to claim 1, wherein said optical nonlinear medium is an optical fiber, and the second light frequency is substantially the same as that of zero-dispersion light for said optical fiber.

10. A conjugator according to claim 1, wherein the element is erbium.

11. A conjugator according to claim 1, wherein said optical nonlinear medium is an optical fiber containing 0.1 ppm to 10 ppm by weight of erbium as said element in a core of said fiber.

12. A conjugator according to claim 1, further comprising an optical filter, optically connected to the output end of said optical nonlinear medium, for selectively transmitting the third light of light output from said optical nonlinear medium.

13. A conjugator according to claim 1, further comprising:

a first optical fiber, having an output end optically connected to the first terminal of said first optical coupler, for transmitting the first light to said first optical coupler; and a second optical fiber, having an input end optically connected to the output end of said optical nonlinear medium, for transmitting light output from said optical nonlinear medium.

14. A conjugator according to claim 1, further comprising:

an optical emitter, optically connected to the first terminal of said first optical coupler, for generating the first light; and an optical receiver, optically connected to the output end of said optical nonlinear medium, for detecting light output from said optical nonlinear medium.

15. An optical phase conjugator comprising:

an optical nonlinear medium for receiving first light having a first light frequency and second light having a second light frequency, and outputting a third light having a third light frequency generated by a nonlinear optical effect based on the first light and the second light, said optical nonlinear medium containing an element to be activated upon irradiation of fourth light having a fourth light frequency and having an amplification function with respect to at least the second light in an active state;

a first optical coupler having a first terminal to which the first light is input, a second terminal to which the second light is input, and a third terminal from which coupled light of the first light and the second light is output, the third terminal being optically connected to an input end of said optical nonlinear medium; and a second optical coupler, optically connected to at least one end selected from the group consisting of the input end and an output end of said optical nonlinear medium, for inputting the fourth light into said medium, said second optical coupler having a first terminal to which the fourth light is input, a second terminal to which light output from said first optical coupler is input, and a third terminal from which coupled light of light input from the second terminal and the fourth light is output, the second terminal being optically connected to the third terminal of said first optical coupler, and the third terminal being optically connected to the input end of said optical nonlinear medium.

16. A conjugator according to claim 15, wherein the first light is original signal light, the second light is pumping light for generating the third light together with the first light, the third light is phase-conjugate light, and the fourth light is activation light for activating the element in said optical nonlinear medium.

17. A conjugator according to claim 15, wherein the following relationship is established between the first, second, and third light frequencies:

$$v_3 = 2v_2 - v_1$$

where $v_1$ is the first light frequency, $v_2$ is the second light frequency, and $v_3$ is the third light frequency.

18. A conjugator according to claim 15, wherein the fourth light frequency is higher than the first light frequency, the second light frequency, and the third light frequency.

19. A conjugator according to claim 15, wherein said optical nonlinear medium is an optical waveguide, and the element is a rare earth element which enables to be activated to amplify light incident thereon by induced emission.

20. A conjugator according to claim 15, further comprising a first light source, optically connected to the second terminal of said first optical coupler, for generating the second light, and a second light source, optically connected to the first terminal of said second optical coupler, for generating the fourth light.

21. A conjugator according to claim 15, wherein said optical nonlinear medium is an optical fiber containing 0.1 ppm to 10 ppm by weight of erbium as said element in a core of said fiber.

22. A conjugator according to claim 15, further comprising an optical filter, optically connected to the output end of said optical nonlinear medium, for selectively transmitting the third light of light output from said optical nonlinear medium.

23. A conjugator according to claim 15, further comprising:

a first optical fiber, having an output end optically connected to the first terminal of said first optical coupler, for transmitting the first light to said first optical coupler; and a second optical fiber, having an input end optically connected to the output end of said optical nonlinear medium, for transmitting light output from said optical nonlinear medium.

24. A conjugator according to claim 15, further comprising:
an optical emitter, optically connected to the first terminal of said first optical coupler, for generating the first light; and
an optical receiver, optically connected to the output end of said optical nonlinear medium, for detecting light output from said optical nonlinear medium.

25. An optical phase conjugator comprising:
an optical nonlinear medium for receiving first light having a first light frequency and second light having a second light frequency, and outputting a third light having a third light frequency generated by a nonlinear optical effect based on the first light and the second light, said optical nonlinear medium containing an element to be activated upon irradiation of fourth light having a fourth light frequency and having an amplification function with respect to at least the second light in an active state;
a first optical coupler having a first terminal to which the first light is input, a second terminal to which the second light is input, and a third terminal from which coupled light of the first light and the second light is output, the third terminal being optically connected to an input end of said optical nonlinear medium;
a second optical coupler, optically connected to at least one end selected from the group consisting of the input end and an output end of said optical nonlinear medium, for inputting the fourth light into said medium, said second optical coupler having a first terminal to which the fourth light is input, a second terminal to which light output from said first optical coupler is input, and a third terminal from which coupled light of light input from the second terminal and the fourth light is output, the second terminal being optically connected to the third terminal of said first optical coupler, and the third terminal being optically connected to the input end of said optical nonlinear medium; and
a third optical coupler having a first terminal to which the fourth light is input, a second terminal to which light output from said optical nonlinear medium is input and from which the fourth light is output, and a third terminal from which light input from the second terminal is output, the second terminal being optically connected to the output end of said optical nonlinear medium.

26. A conjugator according to claim 25, wherein the first light is original signal light, the second light is pumping light for generating the third light together with the first light, the third light is phase-conjugate light, and the fourth light is activation light for activating the element in said optical nonlinear medium.

27. A conjugator according to claim 25, wherein the following relationship is established between the first, second, and third light frequencies:

$$v_3 = 2v_2 - v_1$$

where $v_1$ is the first light frequency, $v_2$ is the second light frequency, and $v_3$ is the third light frequency.

28. A conjugator according to claim 25, wherein the fourth light frequency is higher than the first light frequency, the second light frequency, and the third light frequency.

29. A conjugator according to claim 25, wherein said optical nonlinear medium is an optical waveguide, and the element is a rare earth element which enables to be activated to amplify light incident thereon by induced emission.

30. A conjugator according to claim 25, further comprising a first light source, optically connected to the second terminal of said first optical coupler, for generating the second light, and a second light source, optically connected to the first terminal of said second optical coupler, for generating the fourth light.

31. A conjugator according to claim 25, wherein said optical nonlinear medium is an optical fiber containing 0.1 ppm to 10 ppm by weight of erbium as said element in a core of said fiber.

32. A conjugator according to claim 25, further comprising an optical filter, optically connected to the output end of said optical nonlinear medium, for selectively transmitting the third light of light output from said optical nonlinear medium.

33. A conjugator according to claim 25, further comprising:
a first optical fiber, having an output end optically connected to the first terminal of said first optical coupler, for transmitting the first light to said first optical coupler; and
a second optical fiber, having an input end optically connected to the output end of said optical nonlinear medium, for transmitting light output from said optical nonlinear medium.

34. A conjugator according to claim 25, further comprising:
an optical emitter, optically connected to the first terminal of said first optical coupler, for generating the first light; and
an optical receiver, optically connected to the output end of said optical nonlinear medium, for detecting light output from said optical nonlinear medium.

35. An optical transmission system comprising:
a) an optical phase conjugator including an optical nonlinear medium for receiving first light having a first light frequency and second light having a second light frequency, and outputting a third light having a third light frequency generated by a nonlinear optical effect based on the first light and the second light, said optical nonlinear medium containing an element to be activated upon irradiation of fourth light having a fourth light frequency and having an amplification function with respect to at least the second light in an active state,
a first optical coupler having a first terminal to which the first light is input, a second terminal to which the second light is input, and a third terminal from which coupled light of the first light and the second light is output, the third terminal being optically connected to an input end of said optical nonlinear medium, and
a second optical coupler, optically connected to at least one end selected from the group consisting of the input end and an output end of said optical nonlinear medium, for inputting the fourth light into said medium;

b) an optical fiber, having an input end optically connected to the output end of said optical nonlinear medium of said optical phase conjugator, for transmitting light output from said optical phase conjugator;

c) an optical amplifier, having input and output ends optically connected to the output end of said optical nonlinear medium of said optical phase conjugator, and the input end of said optical fiber, respectively, for amplifying light output from said optical phase conjugator;

d) a local light source for generating fifth light having substantially the same light frequency as the third light frequency; and e) a fourth optical coupler having a first terminal optically connected to said local light source, a second terminal optically connected to the output end of said optical fiber, and a third terminal from which coupled light of light transmitted along said optical fiber and the fifth light is output.

36. A system according to claim 35, further comprising:

f) an optical emitter, optically connected to the first terminal of said first optical coupler of said optical phase conjugator, for generating the first light; and g) an optical receiver, optically connected to the output end of said optical fiber, for detecting light transmitted along said optical fiber.

* * * * *